(12) United States Patent
Hiraike

(10) Patent No.: US 11,601,565 B2
(45) Date of Patent: Mar. 7, 2023

(54) IMAGE FORMING APPARATUS THAT CONTROLS PRINT SPEED ACCORDING TO PRINTING STATUS, CONTROL METHOD FOR THE IMAGE FORMING APPARATUS, AND STORAGE MEDIUM

(71) Applicant: CANON KABUSHIKI KAISHA, Tokyo (JP)

(72) Inventor: Kou Hiraike, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/528,240

(22) Filed: Nov. 17, 2021

(65) Prior Publication Data

US 2022/0191342 A1    Jun. 16, 2022

(30) Foreign Application Priority Data

Dec. 15, 2020    (JP) .............................. JP2020-207223

(51) Int. Cl.
*H04N 1/00* (2006.01)

(52) U.S. Cl.
CPC ..... *H04N 1/00978* (2013.01); *H04N 1/00411* (2013.01)

(58) Field of Classification Search
None
See application file for complete search history.

(56) References Cited

U.S. PATENT DOCUMENTS

| 10,419,635 | B1* | 9/2019 | Qian ..................... H04N 1/0005 |
| 2014/0160526 | A1* | 6/2014 | Shinagawa ........ G03G 15/5025 358/1.15 |
| 2014/0168704 | A1* | 6/2014 | Hasegawa .......... G06K 15/1823 358/1.15 |
| 2014/0314436 | A1* | 10/2014 | Shibahara ............ G03G 15/205 399/68 |
| 2015/0273900 | A1* | 10/2015 | Shinagawa .......... B41J 13/0054 347/16 |
| 2017/0023891 | A1* | 1/2017 | Otsuka ................. G03G 15/205 |
| 2019/0086849 | A1* | 3/2019 | Sasaki .................... G03G 21/00 |

FOREIGN PATENT DOCUMENTS

| JP | 2002-311791 A | 10/2002 |
| JP | 2002311791 A | * 10/2002 |

* cited by examiner

*Primary Examiner* — Henok Shiferaw
(74) *Attorney, Agent, or Firm* — Venable LLP

(57) ABSTRACT

An image forming apparatus includes a controller to set one of a first print mode, in which, after starting printing on a first number of sheets per unit time, a printer decreases a number of sheets on which the printer performs printing per unit time from the first number of sheets per unit time so as to avoid a rise in temperature of a fixing device to a predetermined temperature value, and a second print mode. In the second print mode the printer performs printing on a second number of sheets per unit time without changing, based on a rise in temperature of the fixing device, a number of sheets on which the printer performs printing per unit time, where the second number is smaller than the first number.

10 Claims, 15 Drawing Sheets

FIG. 4

| PAPER SIZE \ PAPER TYPE | THIN PAPER | PLAIN PAPER | THICK PAPER |
|---|---|---|---|
| STANDARD-SIZE PAPER | NOT DISPLAYED | NOT DISPLAYED | NOT DISPLAYED |
| USER DEFINED PAPER | OFF<br>FIXED SPEED<br>HIGH INITIAL SPEED | OFF<br>FIXED SPEED<br>HIGH INITIAL SPEED | OFF<br>FIXED SPEED |
| FREE SIZE PAPER | OFF<br>FIXED SPEED | OFF<br>FIXED SPEED | NOT DISPLAYED |

FIG. 6A

601 PAPER SETTING
- MANUAL FEED
- SHEET FEED CASSETTE
- USER DEFINED PAPER REGISTRATION
- FORM PAPER MODE

→

602 PAPER SIZE
- 1,228 × 457 mm
- FREE SIZE
- ☐ A3
- ☐ A4

→

603 PAPER TYPE
- THIN PAPER (60~60 g/m²)
- PLAIN PAPER (61~120 g/m²)
- THICK PAPER (121~199 g/m²)

→

604 PRINT SPEED IN FORM PAPER MODE
- OFF
- FIXED SPEED

FIG. 6B

601 PAPER SETTING
- MANUAL FEED
- SHEET FEED CASSETTE
- USER DEFINED PAPER REGISTRATION
- FORM PAPER MODE

→

602 PAPER SIZE
- 1,228 × 457 mm
- FREE SIZE
- ☐ A3
- ☐ A4

→

603 PAPER TYPE
- THIN PAPER (60~60 g/m²)
- PLAIN PAPER (61~120 g/m²)
- THICK PAPER (121~199 g/m²)

FIG. 10A

STANDARD-SIZE PAPER

| STANDARD SIZE | THIN PAPER | PLAIN PAPER | THICK PAPER |
|---|---|---|---|
| A3 | TEMPERATURE SETTING A | TEMPERATURE SETTING B | TEMPERATURE SETTING C |
| A4 | | | |
| B5 | | | |

FIG. 10B

FORM PAPER

| WIDTH | HEIGHT | THIN PAPER | | PLAIN PAPER | | THICK PAPER | |
|---|---|---|---|---|---|---|---|
| | | FIXED SPEED | HIGH INITIAL SPEED | FIXED SPEED | HIGH INITIAL SPEED | FIXED SPEED | HIGH INITIAL SPEED |
| 76~312mm | 127~209mm | TEMPERATURE SETTING D | TEMPERATURE SETTING E | TEMPERATURE SETTING F | TEMPERATURE SETTING G | TEMPERATURE SETTING H | NOT AVAILABLE |
| 76~312mm | 210~297mm | TEMPERATURE SETTING I | TEMPERATURE SETTING J | TEMPERATURE SETTING K | TEMPERATURE SETTING L | TEMPERATURE SETTING M | |
| 76~312mm | 298~1200mm | TEMPERATURE SETTING N | TEMPERATURE SETTING O | TEMPERATURE SETTING P | TEMPERATURE SETTING Q | TEMPERATURE SETTING R | |
| FREE SIZE | | TEMPERATURE SETTING S | NOT AVAILABLE | TEMPERATURE SETTING T | NOT AVAILABLE | NOT AVAILABLE | |
| OTHER WIDTH AND HEIGHT | | TEMPERATURE SETTING A | | TEMPERATURE SETTING B | | TEMPERATURE SETTING C | |

FIG. 12

| PAPER SIZE \ PAPER TYPE | THIN PAPER | THIN PAPER | THICK PAPER |
|---|---|---|---|
| STANDARD-SIZE PAPER | NOT DISPLAYED | NOT DISPLAYED | NOT DISPLAYED |
| USER DEFINED PAPER | OFF / FIXED SPEED / HIGH INITIAL SPEED | OFF / FIXED SPEED / HIGH INITIAL SPEED | OFF / FIXED SPEED (400) |
| FREE SIZE PAPER — PAPER SIZE CHECK ON | OFF / FIXED SPEED / HIGH INITIAL SPEED | OFF / FIXED SPEED / HIGH INITIAL SPEED | OFF / FIXED SPEED (1200) |
| FREE SIZE PAPER — PAPER SIZE CHECK OFF | OFF / FIXED SPEED | OFF / FIXED SPEED | NOT DISPLAYED (1201) |

IMAGE FORMING APPARATUS THAT CONTROLS PRINT SPEED ACCORDING TO PRINTING STATUS, CONTROL METHOD FOR THE IMAGE FORMING APPARATUS, AND STORAGE MEDIUM

BACKGROUND OF THE INVENTION

Field of the Invention

The present invention relates to image forming apparatuses, control methods therefor, and storage media.

Description of the Related Art

Image forming apparatuses such as printers and copiers are capable of printing various types of slips such as transfer slips and deposit slips. Most of paper used for printing slips (which is referred to as slip form paper or simply as form paper) is longer and narrower than A4 size plain paper. The form paper is also referred to as small-size paper. When in an image forming apparatus sheets of form paper are continuously fed and a fixing device fixes toner or ink to the sheets, it may cause a phenomenon called an edge temperature rise meaning that the surface temperature of the fixing device excessively rises in a non-sheet passing area through which the sheets of form paper do not pass. In the non-sheet passing area of the fixing device, the edge temperature rise occurs due to, for example, no heat being removed by sheets of form paper. The edge temperature rise can cause a failure of components of the fixing device, and hence it is desirable that the print speed is temporarily decreased so as to cool off the non-sheet passing area.

As a related art, a technique has been proposed in Japanese Laid-Open Patent Publication (Kokai) No. 2002-311791. According to this technique, a print mode is selected from the following in an image forming apparatus: a print mode in which a fixing device is in a state suitable for image formation, a standby mode in which the temperature of the fixing device is lower than in the print mode, and a sleep mode in which the fixing device is not energized.

As described above, if the edge temperature rise in which a part of the surface temperature of a fixing device excessively rises occurs in an image forming apparatus, it can cause a failure of the fixing device, and hence it is desirable to reduce the likelihood of the edge temperature rise. For example, by printing form paper at a constant low speed after the start of printing, an image forming apparatus can reduce the likelihood of the edge temperature rise. In this case, however, productivity decreases due to the low print speed. On the other hand, in a situation where, for example, the number of sheets of form paper to be printed is small, even if the temperature of components of the fixing device rises in the non-sheet-passing area, the temperature rise will never be excessive, so the possibility of a failure of the components of the fixing device is low. It is thus preferred that the print speed is appropriately controlled according to a printing status of the form paper. The above problem may arise not only in printing of form paper but also in printing of other kinds of paper.

SUMMARY OF THE INVENTION

The present invention provides image forming apparatuses, control methods therefor and storage media, which are capable of setting an appropriate print speed according to a printing status.

According to an aspect of the present invention, an image forming apparatus comprises a fixing device that performs printing on paper, a controller, and a display unit that is operable by a user. The controller sets one of a first print mode in which a temperature of the fixing device is adjusted while a print speed of the printing is maintained at a constant speed, or a second print mode in which the temperature of the fixing device is adjusted while the print speed of the printing is kept higher than the constant speed for a predetermined time period after a start of the printing and is decreased as time passes, and controls the printing according to the one of the first print mode or the second print mode. The controller controls the display unit to display a screen for selecting the first print mode or the second print mode.

According to another aspect of the present invention, provided is a control method for an image forming apparatus comprising a fixing device that performs printing on paper, and a display unit that is operable by a user. The control method comprises: setting one of a first print mode in which a temperature of the fixing device is adjusted while a print speed of the printing is maintained at a constant speed, or a second print mode in which the temperature of the fixing device is adjusted while the print speed of the printing is kept higher than the constant speed for a predetermined time period after a start of the printing and is decreased as time passes. The control method further comprises: controlling printing according to the one of the first print mode or the second print mode; and controlling the display unit to display a screen for selecting the first print mode or the second print mode.

According to the present invention, an appropriate print speed can be set according to a printing status.

Further features of the present invention will become apparent from the following description of exemplary embodiments with reference to the attached drawings.

BRIEF DESCRIPTION OF THE DRAWINGS

FIG. 4 is a view illustrating an example of a table used for controlling the display of setting screens in a first embodiment.

FIGS. 6A and 6B are views illustrating another example of transitions between screens displayed on the operation unit in the first embodiment.

FIGS. 10A and 10B are views illustrating tables used for temperature adjustment.

FIG. 12 is a view illustrating an example of a table used for controlling display of setting screens in the second embodiment.

DESCRIPTION OF THE EMBODIMENTS

Embodiments of the present invention will now be described in detail with reference to the drawings. Arrangements in the embodiments described below, however, are just examples, and the scope of the present invention should not be limited by the arrangements in the embodiments described below.

First Embodiment

Figure 1:
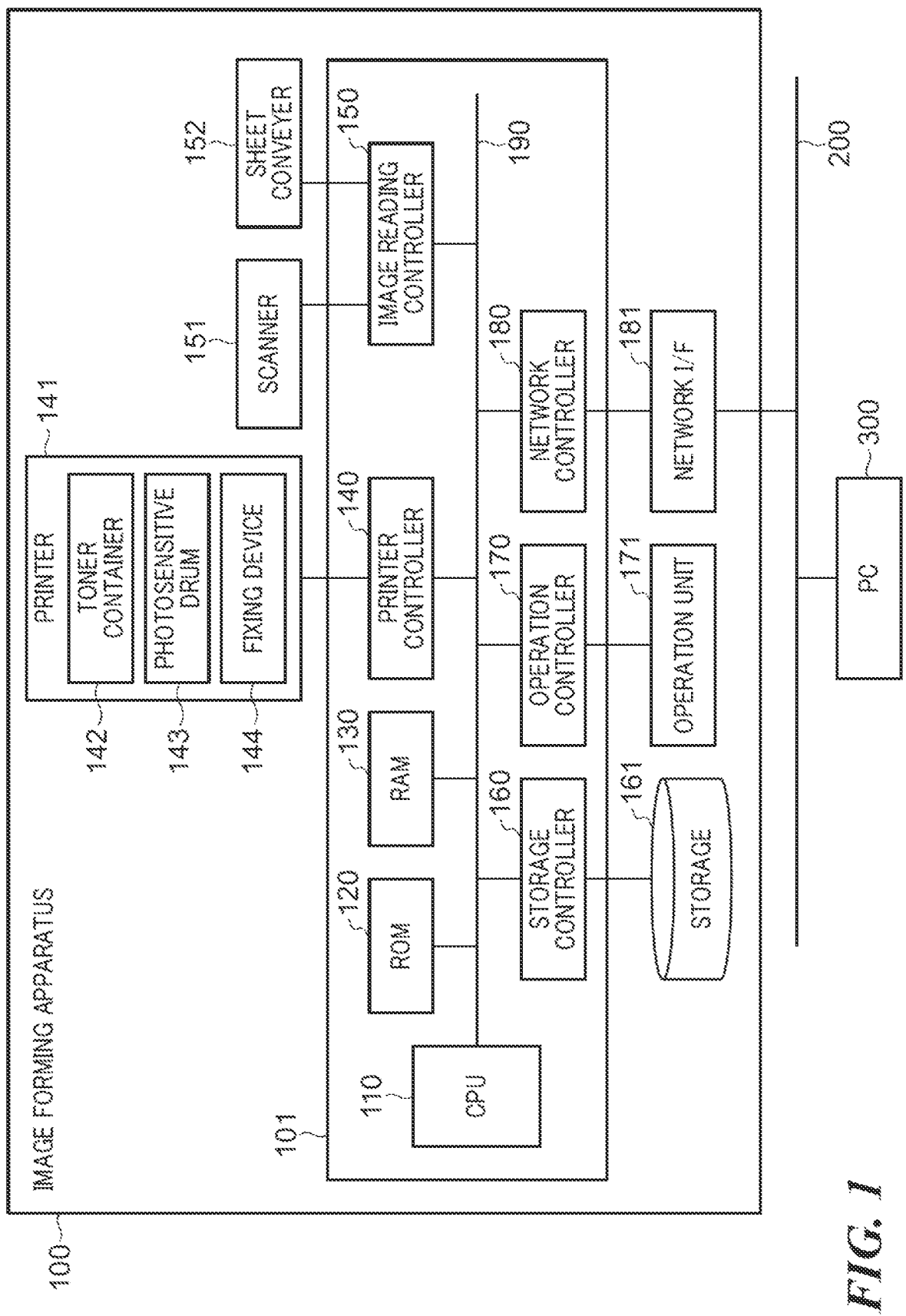
FIG. 1 is a block diagram illustrating an example of a hardware arrangement of an image forming apparatus in FIG. 1.

FIG. 1 is a block diagram illustrating an example of a hardware arrangement of an image forming apparatus 100. The image forming apparatus 100 includes a controller 101. The controller 101 includes a CPU 110, ROM 120, and a RAM 130. The controller 101 includes a printer controller 140, an image reading controller 150, a storage controller 160, and an operation controller 170. The components of the controller 101 are connected to one another via a bus 190. The image forming apparatus 100 includes a printer 141, a scanner 151, a sheet conveyer 152, a storage 161, and an operation unit 171. The printer controller 140, the image reading controller 150, the storage controller 160, and the operation controller 170 function as interfaces when the CPU 110 controls hardware devices connected to these components.

The printer 141 is a printing unit (print engine) that includes a toner container 142, a photosensitive drum 143, and a fixing device 144. The printer 141 performs image formation by an electrophotographic process in which it uses image data (for example, bitmap data) generated by the controller 101 to form a toner image on a sheet of paper and causes the fixing device 144 to fix the toner image based on the image data to the sheet (for example, by causing the CPU 110 to adjust the temperature of a fixing heater of the fixing device 144 to heat the toner image). The printer 141 may use any process to perform image formation. For example, the printer 141 may perform image formation by an inkjet printing process in which it discharges ink onto a sheet of paper to print an image. Printing material used by the electrophotographic process is toner while printing material used by the inkjet printing process is ink. The printer 141 may have another arrangement. The following description assumes that paper to be printed is form paper (slip form paper). Paper to be printed, however, may be any paper other than form paper.

The controller 101 including the CPU 110 controls the entire image forming apparatus 100. The CPU 110 starts an OS (Operating System) by a boot program stored in the ROM 120. The CPU 110 then executes control programs stored in the ROM 120 and the storage 161 on the OS. The RAM 130 is used as a main memory, a work area, and other temporary storage areas for the CPU 110. The CPU 110 accesses the storage 161 via the storage controller 160. The storage 161 is a readable and writable nonvolatile storage device like an HDD. The storage 161 stores a program for controlling the entire image forming apparatus 100, various application programs, image data, print settings for form paper received via the operation unit 171, and so forth. In each embodiment, control of the image forming apparatus 100 is implemented by the CPU 110 executing programs loaded into the RAM 130. The control of the image forming apparatus 100 may be implemented by a plurality of CPUs, RAM, and ROM. The control of the image forming apparatus 100 may also be implemented by a hardware circuit such as an ASIC or FPGA executing a part or all of processes for the control.

The CPU 100 performs various control processes. For example, the CPU 110 controls the scanner 151 via the image reading controller 150 to read an image on a sheet and generates image data from the read image. The CPU 110 also controls the sheet conveyer 152, which includes an ADF (auto document feeder), to convey sheets placed on a tray of the sheet conveyer 152 one by one to the scanner 151 so as to generate image data. The scanner 151 scans a sheet using an optical reading device like a CCD and converts image information on the sheet into electric signal data. The image data obtained by the optical reading device reading the image on the sheet is stored in the storage 161. The image data stored in the storage 161 is used for printing and other processes.

The operation controller 170 is an interface that connects the operation unit 171 and the controller 101 together. The operation unit 171 is an operable display unit that has a function of displaying information for a user and a function of receiving user's operations. It is assumed that the operation unit 171 in each embodiment is a touch screen display. The operation unit 171, however, is not limited to a touch screen display, and can be any user interface that has the function of displaying information for a user and the function of receiving user's operations. For example, the display function and the operation reception function of the operation unit 171 may be separately provided. Setting screens, which will be described later, are displayed on the operation unit 171 under the control of the CPU 110. The operation unit 171 may include hard keys such as a key for starting printing, a key for viewing a status of the image forming apparatus 100 and a key for canceling printing. A network controller 180 connects a network I/F 181 and a wired LAN 200 together via a LAN cable. A PC 300 is connected to the wired LAN 200 via the LAN cable. As a result, the image forming apparatus 100 and the PC 300 are connected together via a wired network. It should be noted that the image forming apparatus 100 and the PC 300 may be connected together via a wireless network.

Figure 2:
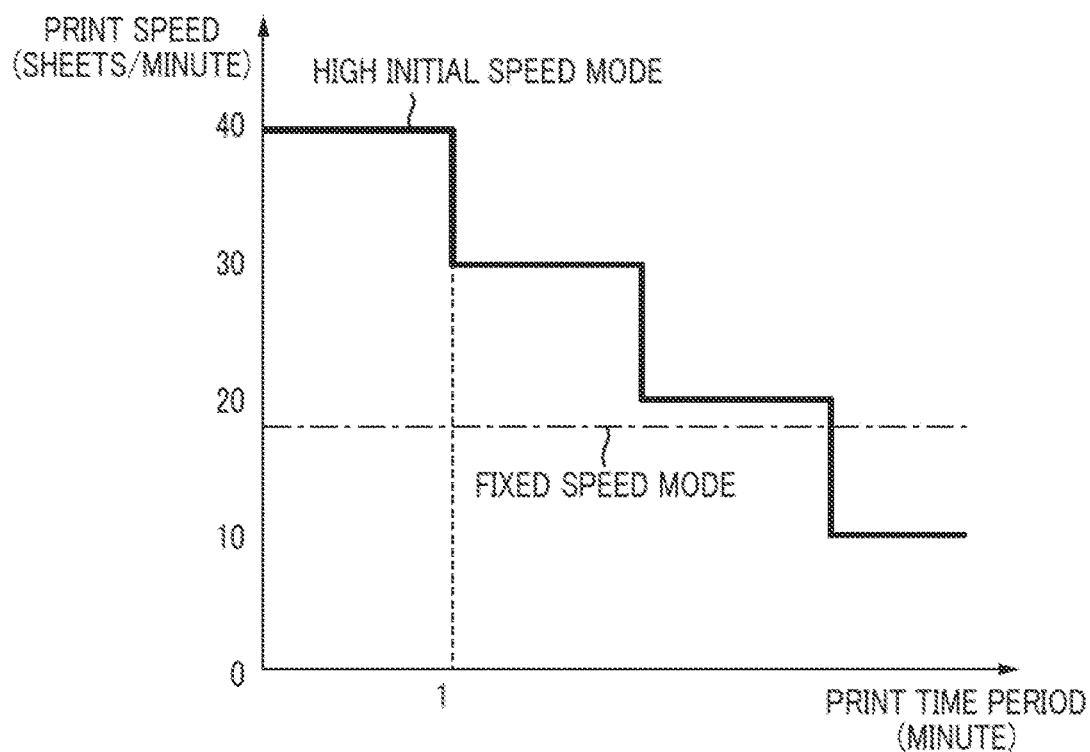
FIG. 2 is a graph illustrating a first example of print modes.

A description will now be given of modes of print speeds (print modes). There are two print modes: a fixed speed mode and a high initial speed mode. FIG. 2 is a graph illustrating a first example of the print modes. In FIG. 2, the vertical axis represents the number of sheets printed per minute (print speed), and the horizontal axis represents a time period that has elapsed since the start of printing (print time period) and is expressed in minutes. The fixed speed mode indicated by a long dashed dotted line is a first print mode in which printing is performed while the print speed is maintained at a constant speed after the start of the printing. An edge temperature rise of the fixing device 144 is a phenomenon in which the surface temperature of the fixing device 144 excessively rises in a non-sheet passing area through which sheets (in particular, sheets of form paper) do not pass. In the fixed speed mode, settings are made such that the temperature of the fixing device 144 is adjusted suitably for high-volume printing. Moreover, in the fixed speed mode, the temperature of the fixing device 144 is adjusted according to the thickness of paper like plain paper or thick paper, which is called a basis weight, so that a constant print speed can be maintained.

In the high initial speed mode indicated by a solid line is a second print mode in which printing is performed at higher speed than in the fixed print mode for a predetermined time period after the start of the printing, and then the printing is performed while the print speed is decreased as time passes. In the high initial speed mode in the example illustrated in FIG. 2, the print speed is decreased in a stepwise manner. It is assumed that the print speed at the start of printing in the high initial speed mode is the maximum possible speed at which the image forming apparatus 100 is capable of performing printing. The print speed at the start of printing in the high initial speed mode should be higher than the print speed in the fixed speed mode although it may be lower than the above maximum possible speed. In the high initial speed mode, the print speed is maintained at the highest speed for a predetermined time period after the start of printing and then decreases as time passes. The temperature of the fixing device 144 is adjusted according to the print speed in the high initial speed mode. It should be noted that in the example illustrated in FIG. 2, the above predetermined time period is one minute, but it may be set freely.

As illustrated in FIG. 2, the high initial speed mode achieves high productivity since high speed printing is allowed at the start of printing. On the other hand, in the high initial speed mode, although the print speed is high at the start of printing, the print speed decreases as time passes and becomes lower than the print speed in the fixed speed mode so that the likelihood of the edge temperature rise in the fixing device 144 can be reduced. Thus, if high-volume printing is performed in the high initial speed mode, it takes a long time to complete the printing. From this viewpoint, the fixed speed is suitable for high-volume printing because the print speed is maintained constant. When the fixed speed mode is used for high-volume printing and the high initial speed mode is used for low-volume printing, it reduces the likelihood of the edge temperature rise in the fixing device 144, while increasing the productivity.

Figure 3:
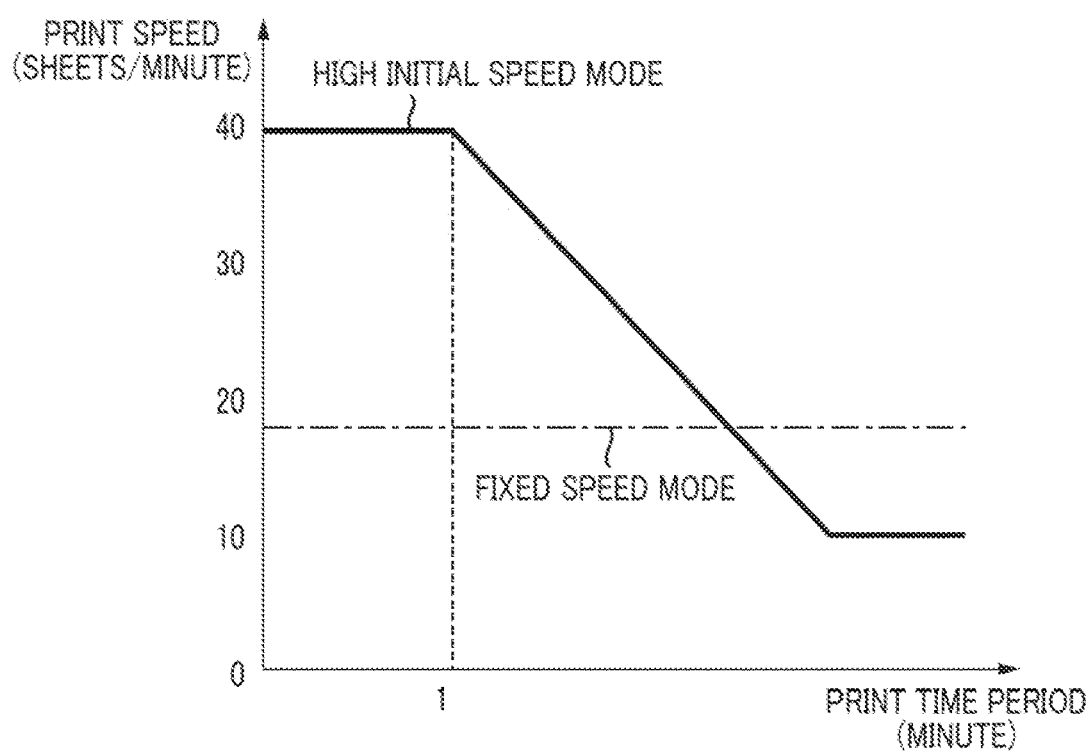
FIG. 3 is a graph illustrating a second example of print modes.

FIG. 3 is a graph illustrating a second example of the print modes. The fixed speed mode in the example in FIG. 3 is the same as in FIG. 2. On the other hand, in the high initial speed mode, after a predetermined time period has elapsed since the start of printing, the print speed is controlled to decrease linearly, not in a stepwise manner. Either the example illustrated in FIG. 2 or the example illustrated in FIG. 3 may be used as the high initial speed mode. It is assumed that the control of the print speed in FIGS. 2 and 3 is performed by decreasing or increasing the interval at which sheets of paper are fed while a constant rotational speed of a rotary member like the photosensitive drum 143 is maintained. Alternatively, the control of the print speed may be performed by variably controlling the rotational speed of the rotary member like the photosensitive drum 143.

A description will now be given of how the display of setting screens on the operation unit 171 is controlled. FIG. 4 is a view illustrating an example of a table used for controlling the display of setting screens in the first embodiment. By referring to the table of FIG. 4, the CPU 110 controls the operation unit 171 to display setting screens. The table in FIG. 4 is stored in, for example, the ROM 120 or the storage 161. As illustrated in the table in FIG. 4, whether or not the operation unit 171 displays a setting screen for selecting the print mode and the content of the setting screen vary depending on the size and type of paper to be printed. Papers are classified according to size into three categories: standard-size papers such as A3 and A4 papers, user defined papers whose width and height are freely defined by a user, and free size papers. The free size papers are intended for a case where, for example, the paper size is frequently changed, and there is no need for free size papers to change paper size settings every time the paper size is changed. In a case where a setting to perform free size printing is made, the CPU 110 does not recognize the paper size.

The paper types are classified into three categories: thin papers, plain papers, and thick papers according to the thickness of paper called basis weight. As described above, it is assumed that the control described in each embodiment is carried out for form paper. Thus, in a case where paper to be printed is standard-size paper, it is unnecessary to carry out special control to be subjected to form paper. When standard-size paper is set for the paper size, a setting screen for selecting the print mode is not displayed regardless of the paper type. When user defined paper is set for the paper size, a setting screen indicating items suitable for the paper type among options 400 in the table is displayed. When thin paper or plain paper is set for the paper type, both the fixed speed mode and the high initial speed mode are indicated in a setting screen. Namely, a user is allowed to select either the fixed speed mode or the high initial speed mode on the setting screen via the operation unit 171. On the other hand, when thick paper is set for the paper type, a setting screen that indicates only the fixed speed mode so as to be selectable by a user for the print mode is displayed. In this case, a user is not allowed to select the high initial speed mode but is allowed to select only the fixed speed mode for a print mode on the setting screen.

When free size is set for the paper size, a setting screen indicating items suitable for the paper type among options 401 in the table is displayed. When thin paper or plain paper is set for the paper type, a setting screen that indicates only the fixed speed mode so as to be selectable by a user for the print mode is displayed. In this case, a user is not allowed to select the high initial speed mode but is allowed to select only the fixed speed mode for the print mode on the setting screen. When thick paper is set for the paper type, a setting screen for selecting the print mode is not displayed. Thus, the print mode can be set more flexibly for user defined paper than for free size paper. Likewise, the print mode can be set more flexibly for thin paper and plain paper than for thick paper.

For user defined paper, the width and the height of the paper are set by a user via the operation unit 171, and hence the CPU 110 can recognize the width and height of the paper to be printed. Thus, when user defined paper is set for the paper size, it allows the CPU 110 to adjust the temperature of the fixing device 144 with fine granularity according to the paper size. If, however, thick paper is set for the paper type, it is desirable to set the temperature of the fixing device 144 at a relatively high temperature so as to fix toner or ink on paper more firmly. Thus, it is not preferred that the high initial speed mode is set in this case because it is difficult to adjust the temperature of the fixing device 144 in the high initial speed mode. Accordingly, when user defined paper is set for the paper size and thick paper is set for the paper type, a setting screen that indicates only the fixed speed mode so as to be selectable by a user for the print mode is displayed. On the other hand, when user defined paper is set for the paper size and thin paper or plain paper is set for the paper type, a setting screen that indicates the fixed speed mode and the high initial speed so as to be selectable by a user for the print mode is displayed. When free size is set for the paper size, the CPU 110 cannot recognize the width and the height of paper to be printed. Thus, when free size is set for the paper size, a setting screen that indicates only the fixed speed mode so as to be selectable by a user for the print mode is displayed.

Figure 5A:
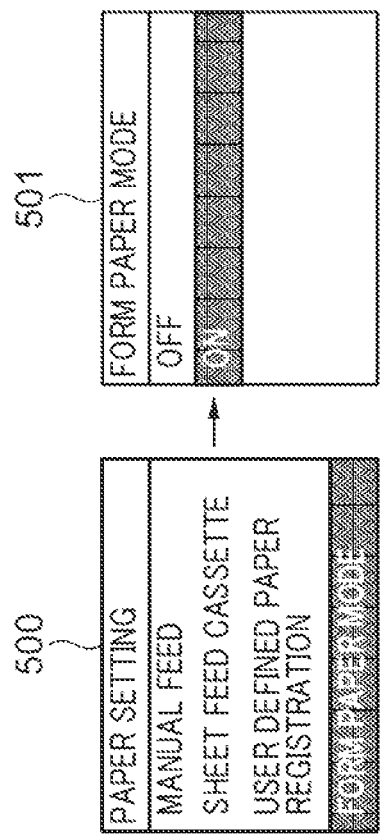
FIGS. 5A to 5C are views illustrating an example of transitions between screens displayed on an operation unit in the first embodiment.
Figure 5B:
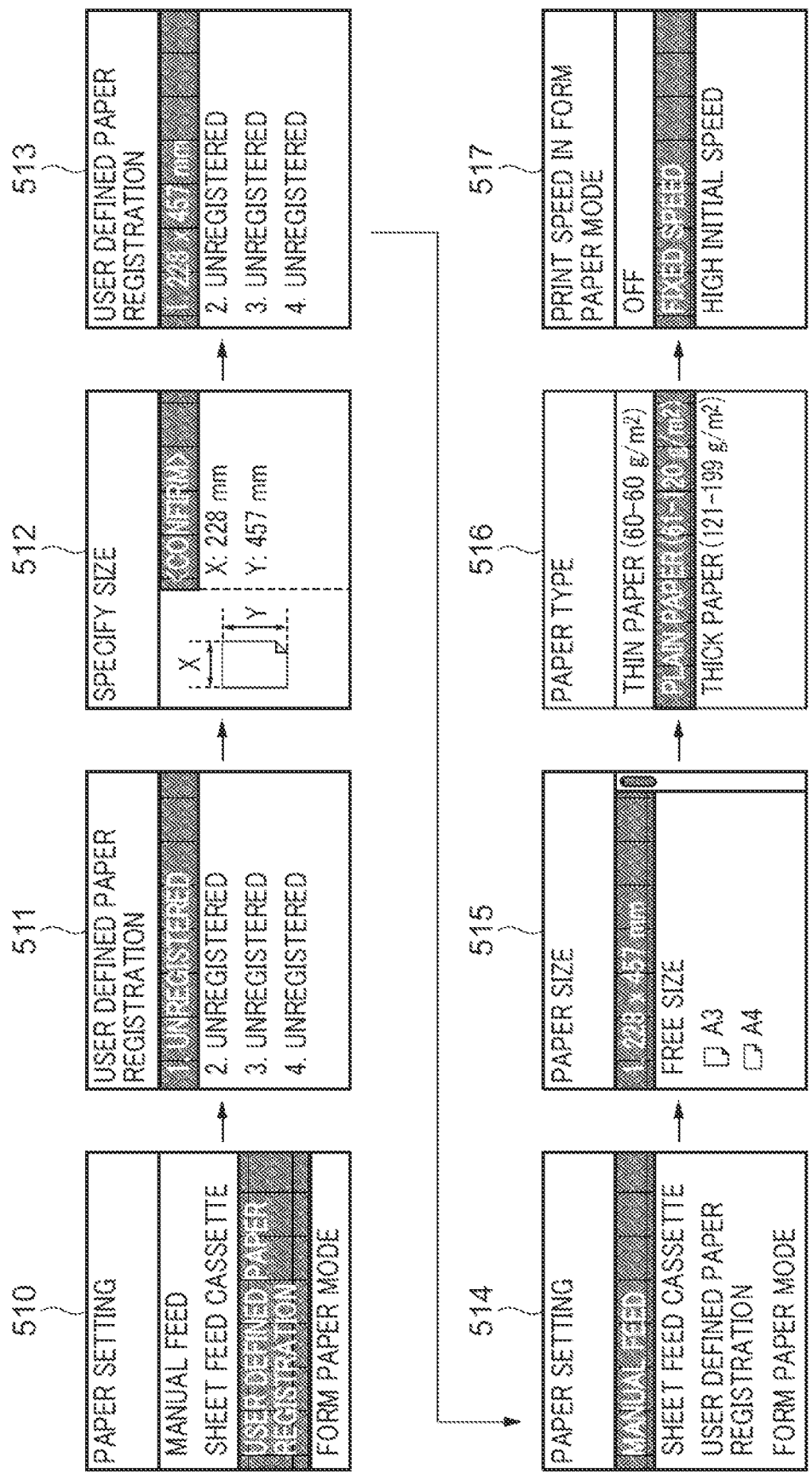
Figure 5C:
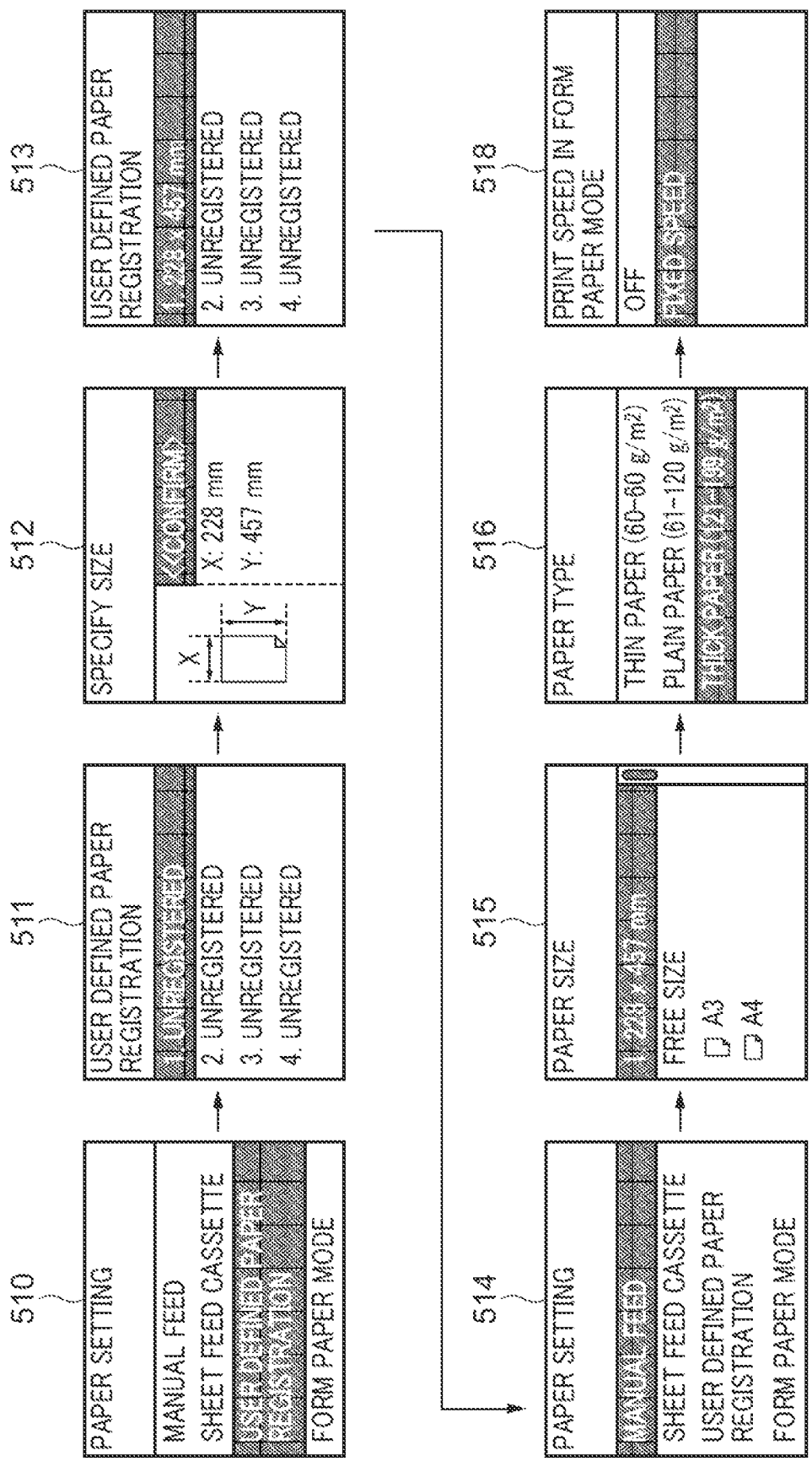

FIGS. 5A to 5C are views illustrating an example of transitions between screens displayed on the operation unit 171 in the first embodiment. For example, when a user makes an input to the operation unit 171 of the image forming apparatus 100 to instruct to configure print settings, the CPU 110 controls the operation unit 171 to display a screen 500 for selection of paper settings. The screen 500 indicates a plurality of options so as to be selectable by a user. When an operation to select the form paper mode on the screen 500 in FIG. 5A is performed on the operation unit 171, the CPU 110 controls the operation unit 171 to display a screen 501. The screen 501 is a screen which allows a user to select whether to enable or disable the form paper mode.

Here, the control described in each embodiment is carried out for form paper as described above. The form paper mode is a mode that is enabled when paper to be printed is form paper. When an operation to select "ON" in the screen 501 has been performed on the operation unit 171, the CPU 110 recognizes that the form paper mode is enabled. When the form paper mode is enabled, the CPU 110 controls the display of the screen for selecting either the fixed speed mode or the high initial speed mode. On the other hand, when an operation to select "OFF" in the screen 501 has been performed on the operation unit 171, the CPU 110 recognizes that form paper is not to be printed. When the form paper mode is disabled, the CPU 110 does not control the display of the screen for selecting one of the fixed speed mode or the high initial speed mode. In the following description, it is assumed that "ON" has been selected in the screen 501.

FIG. 5B illustrates transitions between screens in a case where thin paper or plain paper is selected for the paper type. A screen 510 is the same as the screen 500. Suppose that a user defined paper registration option is selected while the screen 510 is displayed on the operation unit 171. The user defined paper registration option is an option for registering the width and the height as the paper size of user defined paper. When an operation to select the user defined paper registration option has been performed on the operation unit 171, the CPU 110 controls the operation unit 171 to display a screen 511. The screen 511 is a screen on which a user is allowed to select a registration destination of user defined paper. A user is allowed to register multiple types of user defined paper. In the example illustrated in FIG. 5B, four types of user defined paper are allowed to be registered. The number of types of user defined paper that are allowed to be registered may be any number.

The screen 511 in FIG. 5B indicates four unregistered options. When an operation to select any unregistered option has been performed on the operation unit 171, the CPU 110 controls the operation unit 171 to display a screen 512. The screen 512 is a screen for inputting the width and the height of a paper size. In the screen 512, a horizontal direction with respect to the image forming apparatus 100 is an X direction, and a vertical direction with respect to the image forming apparatus 100 is a Y direction. When the width and the height have been input, the CPU 110 controls the operation unit 171 to display a screen 513. The screen 513 indicates that the width and height of the paper size set on the screen 512 have been registered. The user can confirm the registered width and height of the paper size by referring to what is indicated in the screen 513.

When an operation to display a paper setting screen on the operation unit 171 has been performed, the CPU 110 controls the operation unit 171 to display a screen 514. The screen 514 is the same as the screen 500. When an operation to select a manual feed option in the screen 514 has been performed on the operation unit 171, the CPU 110 controls the operation unit 171 to display a screen 515. A user is allowed to select a manual feed slot or a sheet feed cassette for a sheet feed port for paper to be printed. The manual feed slot is a sheet feed port suitable for a case where the paper size is frequently changed. The sheet feed cassette is a sheet feed port suitable for a case where the paper size is fixed. The screen 514 indicates that the manual feed option has been selected.

The screen 515 indicates user defined paper registered on the screen 512 and the screen 513 described above, and free size, A3, and A4 options so as to be selectable by a user. A3 and A4 papers are standard-size papers. A user is allowed to select any option in the screen 515 for the paper size. The screen 515 indicates that registered user defined paper has been selected. In this case, the CPU 110 control the operation unit 171 to display a screen 516. A user is allowed to select, in the screen 516, one of thin paper, plain paper, and thick paper. In each embodiment, the temperature of the fixing device 144 is adjusted to be a temperature suitable for the thickness of paper to be printed. In the example in FIG. 5B, plain paper is selected in the screen 516.

Here, registered user defined paper has been selected in the screen 515, and plain paper has been selected in the screen 516. By referring to the table of FIG. 4, the CPU 110 performs screen control according to the selections made in the screens. As can be seen in the table in FIG. 4, when user setting paper has been selected for the paper size and the plain paper has been selected for the paper type, a user is allowed to select the fixed speed mode or the high initial speed mode for the print mode. Accordingly, the CPU 110 controls the operation unit 171 to display a screen 517 on which a user is allowed to select either the fixed speed mode or the high initial speed mode. Although the fixed speed mode has been selected in the screen 517, the high initial speed mode may be selected as well. When the fixed speed mode is selected, the CPU 110 controls printing in the fixed speed mode. It should be noted that when a standard paper size such as A3 or A4 is selected in the screen 515, the CPU 110 completes the setting process without displaying the screen for selecting either the fixed speed mode or the high initial speed mode on the operation unit 171 according to the table of FIG. 4.

FIG. 5C illustrates transitions between screens in a case where thick paper is selected for the paper type. The screens 510 to 515 are the same as those in FIG. 5B, and hence description thereof is omitted. In the example in FIG. 5C, thick paper is selected in the screen 516. In this case, by referring to the table of FIG. 4, the CPU 110 controls the operation unit 171 to display a screen 518. According to the table of FIG. 4, when user defined paper has been selected for the paper size and thick paper has been selected for the paper type, only the fixed speed mode is allowed to be selected for the print mode. Accordingly, the CPU 110 controls the operation unit 171 to display the screen 518, on which a user is allowed to select only the fixed speed mode for the print mode.

FIGS. 6A and 6B are views illustrating another example of transitions between screens displayed on the operation unit 171 in the first embodiment. A screen 601 in FIG. 5A is the same as the screen 514. When free size is selected for the paper size in the screen 602, the CPU 110 controls the operation unit 171 to display a screen 603. When plain paper is selected for the paper type in the screen 603, the CPU 110 refers to the table of FIG. 4. According to the table of FIG. 4, when free size has been selected for the paper size and plain paper has been selected for the paper type, only the fixed speed mode is allowed to be selected for the print mode. Accordingly, the CPU 110 controls the operation unit 171 to display a screen 604, on which a user is allowed only the fixed speed mode for the print mode.

Screens 601 to 603 in FIG. 6B are the same as those in FIG. 6B. When thick paper is selected for the paper type on the screen 603, the CPU 110 refers to the table of FIG. 4. In the table of FIG. 4, when free size has been selected for the paper size and thick paper has been selected for the paper types, a screen for selecting the print mode is not displayed. Accordingly, the CPU 110 completes the setting process without displaying the screen on which a user is allowed to select either the fixed speed mode or the high initial speed mode on the operation unit 171.

In a case where the form paper mode has been set to "OFF" in the screen 501 in FIG. 5A, the screen on which a user is allowed to select either the fixed speed mode or the high initial speed mode is not displayed. Thus, in a case where the form paper mode has been set to "OFF", the CPU 110 completes the setting process without displaying the screen 517, after displaying the screen 516. Likewise, in a case where the form paper mode is set to "OFF", the CPU 110 completes the setting process without displaying the screen 516, after displaying the screen 515 in FIG. 5B.

Figure 7:
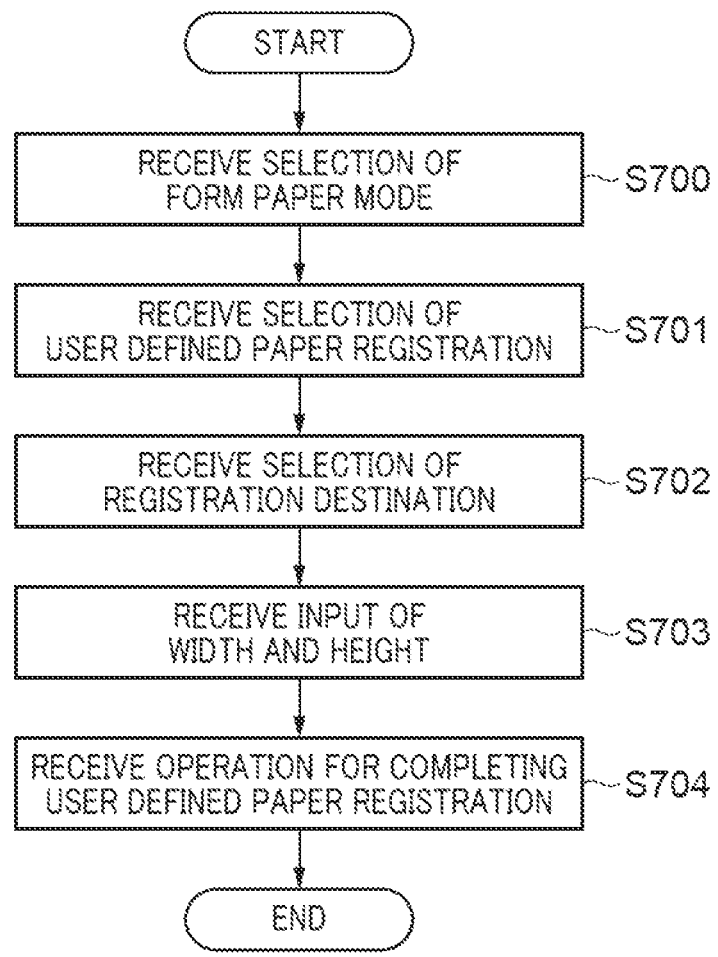
FIG. 7 is a flowchart of an example of a first process in a setting operation in the first embodiment.

A description will now be given of a first process in a setting operation. FIG. 7 is a flowchart illustrating an example of the first process in the setting operation according to the first embodiment. In S700, the CPU 110 receives a selection of the form paper mode by a user while the screen 501 in FIG. 5A is displayed on the operation unit 171. In S701, the CPU 110 receives a selection of the user defined paper registration option by the user while the screen 510 in FIG. 5B or 5C is displayed on the operation unit 171. In S702, the CPU 110 receives a selection of a registration destination of user defined paper by the user while the screen 511 is displayed on the operation unit 171. In S703, the CPU 110 receives a selection of the width and the height of paper by the user while the screen 512 is displayed on the operation unit 171. In S704, the CPU 110 receives an operation for completing the user defined paper registration by the user while the screen 513 is displayed on the operation unit 171. The selections made in S700 to S704 are stored as settings in the RAM 130, the storage 161, or the like.

Figure 8:
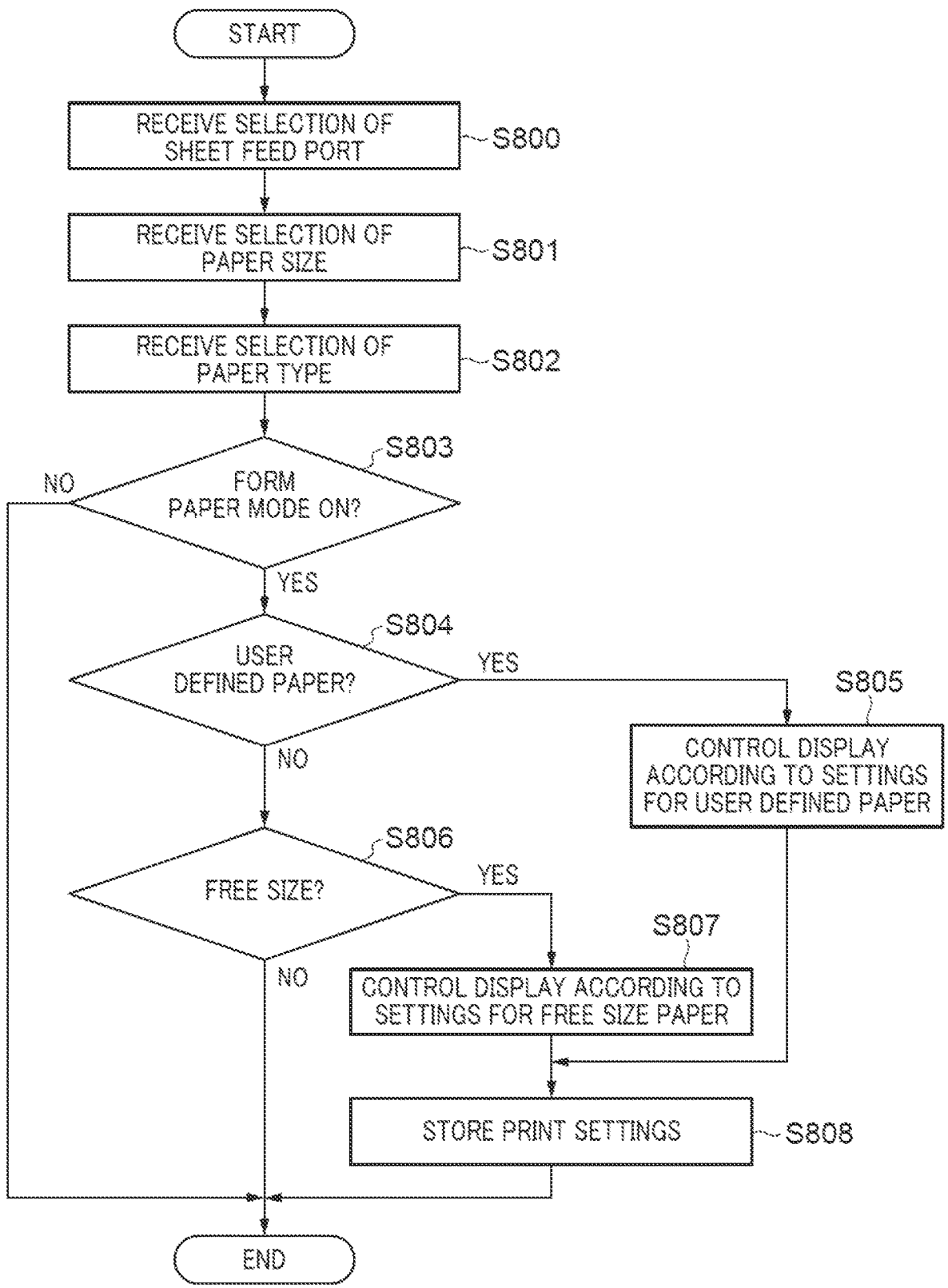
FIG. 8 is a flowchart of an example of a second process in a setting operation in the first embodiment.

A description will now be given of a second process in the setting operation following the first process in the setting operation described above. FIG. 8 is a flowchart illustrating an example of the second process in the setting operation according to the first embodiment. In S800, the CPU 110 receives a selection of a sheet feed port by the user while the screen 514 is displayed on the operation unit 171. In S801, the CPU 110 receives a selection of the paper size by the user while the screen 515 is displayed on the operation unit 171. In S802, the CPU 110 receives a selection of the paper type by the user while the screen 516 is displayed on the operation unit 171. The selections made in S800 to S802 are stored as settings in the RAM 130, the storage 161, or the like.

In S803, the CPU 110 judges whether or not the form paper mode on the screen 501 in FIG. 5A has been set to "ON". For example, the CPU 110 makes the judgment in S803 by referring to the settings stored in the RAM 130, the storage 161, or the like. When the result of the judgment in S803 is negative (NO), the CPU 110 ends the process in the flowchart of FIG. 8 because the form paper mode is disabled. When the result of the judgment in S803 is positive (YES), the CPU 110 advances the process to S804. In S804, the CPU 110 judges whether or not user defined paper is set for the paper size. When the result of the judgment in S804 is positive (YES), the CPU 110 lets the process proceed to S805. In S805, by referring to the table of FIG. 4, the CPU 110 uses suitable items for the paper type among the user defined paper setting options 400 to control the display of a screen for selecting the print mode (the screen 517 or the screen 518) on the operation unit 171.

When the result of the judgment in S804 is negative (NO), the CPU 110 lets the process proceed to S806. In S806, the CPU 110 judges whether or not free size is set for the paper size. When the result of the judgment in S806 is negative (NO), neither user defined paper nor free size is set for the paper size, and hence the CPU 110 ends the flowchart of FIG. 8. When the result of the judgment in S806 is positive (YES), the CPU 110 lets the process proceed to S807. In S807, by referring to the table of FIG. 4, the CPU 110 uses suitable items for the paper type among the free size setting options 401 to controls the display of a screen for selecting the print mode (display the screen 604 or not display the screen) on the operation unit 171. Then, the CPU 110 lets the process proceed to S808. In S808, the CPU 110 stores print settings according to the selections made in the screens in S805 or S807 in the RAM 130, the storage 161, or the like.

Figure 9:
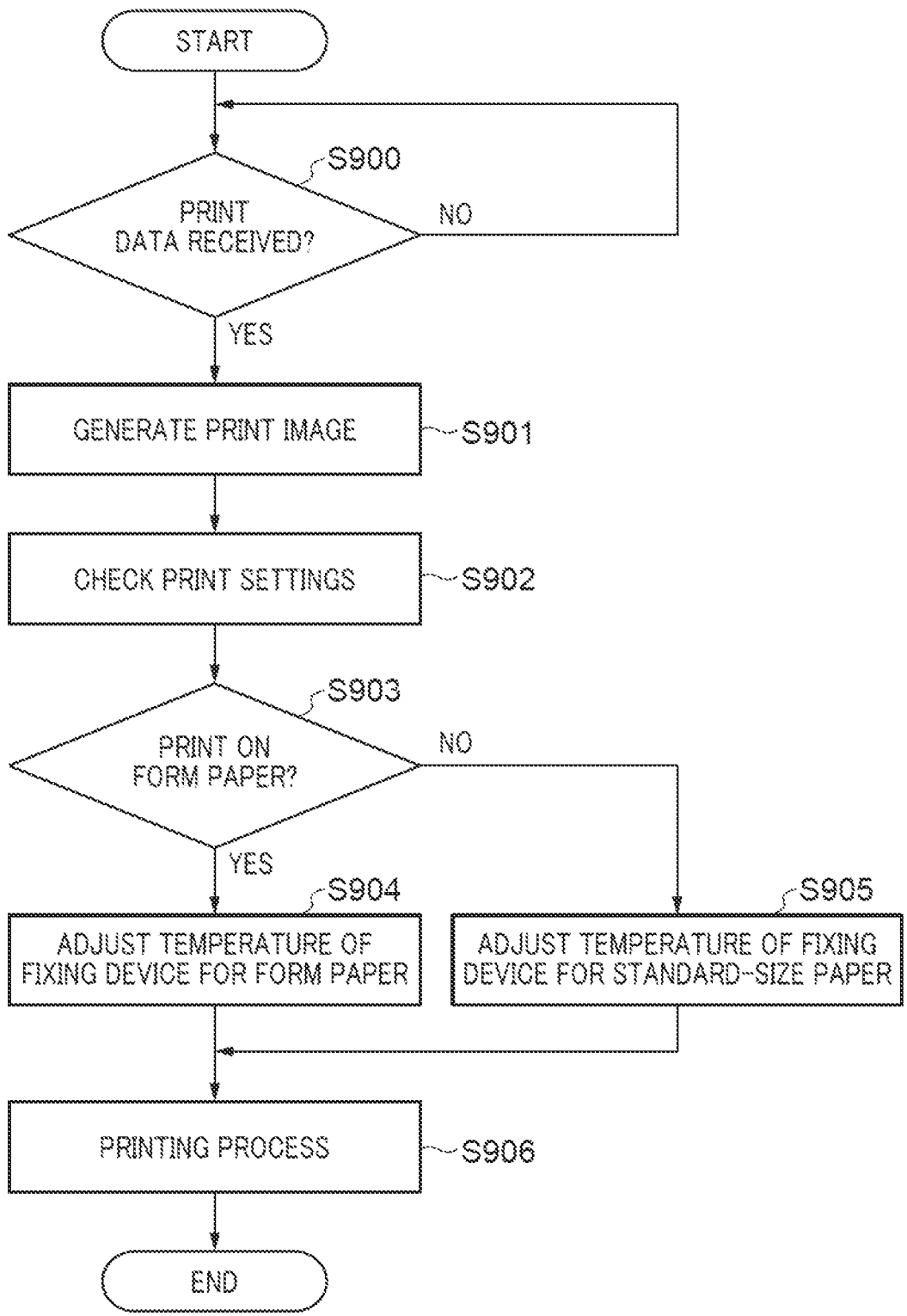
FIG. 9 is a flowchart of an example of a printing process in the first embodiment.

A description will now be given of a printing process. FIG. 9 is a flowchart illustrating an example of the printing process in the first embodiment. In S900, the CPU 110 judges whether or not print data has been received. For example, the result of the judgment by the CPU 110 in S900 is positive (YES) when print data has been received from the PC 300 via the network controller 180 and the network I/F 181. While the result of the judgment in S900 is negative (NO), the CPU 110 repeatedly carries out the judgment process in S900 without letting the process proceed to S901. When the result of the judgment in S900 is positive (YES), the CPU 110 lets the process proceed to S901. In S901, the CPU 110 carries out a process of generating a print image based on the received print data. In S902, the CPU 110 checks print settings stored in the RAM 130, the storage 161, or the like.

In S903, based on the print settings, the CPU 110 judges whether or not form paper is to be printed. When the result of the judgment in S903 is positive (YES), the CPU 110 lets the process proceed to S904. In S904, the CPU 110 adjusts the temperature of the fixing device 144 for the form paper. When the result of the judgment in S903 is negative (NO), the CPU 110 lets the process proceed to S905. In S905, the CPU 110 adjusts the temperature of the fixing device 144 for standard-size paper. In S906, the CPU 110 causes the printer 141 to carry out the printing process by controlling print output from the printer 141 while adjusting the temperature of the fixing device 144 in S904 or S905.

A description will now be given of the temperature adjustment in S904 and S905. FIGS. 10A and 10B are views illustrating an example of tables used for the temperature adjustment. The table 1000 in FIG. 10A illustrates temperature settings for standard-size papers such as A3, A4, and B5 papers. The temperature settings A to C represent temperatures of the fixing device 144 set for the temperature adjustment. When printing is performed using standard-size paper, the CPU 110 adjusts the temperature of the fixing device 144 based on the table 1000 according to which of thin paper, plain paper, or thick paper is set for the paper type of paper to be printed. For example, when A4 is set for the paper size and thin paper is set for the paper type, the CPU 110 increases the temperature of the fixing device 144 up to the temperature setting A.

The table 1001 in FIG. 10B illustrates temperature settings for form paper. The temperature settings A to T represent temperatures of the fixing device 144 set according to paper sizes, paper types, and print modes. User defined papers are classified into three groups according to their width and height. In the example in FIG. 10B, user defined papers are classified into the following three groups: a group with a width of "76 mm to 312 mm" and a height of "127 mm to 209 mm", a group with a width of "76 mm to 312 mm" and a height of "210 mm to 297 mm", and a group with a width of "76 mm to 312 mm" and a height of "298 mm to 1200 mm". The number of groups into which user defined papers are classified and numeric values that are references for use in classification of user defined papers are not limited to those in the example in FIG. 10B. In each group, the temperature settings for the fixed speed mode and the high initial speed mode are defined with respect to each of thin paper, plain paper, and thick paper.

When user defined paper is set for the paper size and thick paper is set for the paper type, a user is not allowed to select the high initial speed mode as described above. There may be a case where settings for form paper to be printed fall outside the predetermined ranges of the width and the height that are allowed to be set for form paper. In the example in FIG. 10B, when the width and the height fall outside the predetermined ranges, the same temperature settings are defined as those for standard-size paper. It should be noted that when the width and the height fall outside the predetermined ranges, the temperature settings may be defined such that, for example, the fixed speed mode and the high initial speed mode is not allowed to be selected. As a result, even if form paper to be printed is of a special size, the temperature of the fixing device 144 is adjusted.

As can be seen in FIG. 10B, when user defined paper is selected, the temperature of the fixing device 144 is adjusted with fine granularity according to the size set by a user. For example, when the paper size is set to a 200 mm width and a 300 mm height and plain paper is set for the paper type, either the fixed speed mode or the high initial speed mode is allowed to be selected. When the fixed speed mode is selected, the CPU 110 increases the temperature of the fixing device 144 up to the temperature setting P. On the other hand, when the high initial speed mode is selected, the CPU 110 increases the temperature of the fixing device 144 up to the temperature setting Q at a maximum. When free size is selected for the paper size, its width and height is unknown. Accordingly, referring to the table of FIG. 10B, the CPU 110 increases the temperature of the fixing device 144 to the temperature setting S or the temperature setting T according to whether thin paper or plain paper has been set for the paper type.

As described above, in the first embodiment, the screen for selecting either the fixed speed mode or the high initial speed mode is displayed on the operation unit 171. As a result, an appropriate print speed can be set according to a printing status. For example, as illustrated in FIG. 2, when the print mode is set to the high initial speed mode, the image forming apparatus 100 is capable of printing 40 sheets per minute. On this occasion, when the number of sheets to be printed is about 40, printing should be performed using the high initial speed mode. This makes it possible to obtain results (printed paper) at higher speed and achieve higher productivity than in the case where printing is performed using the fixed speed mode. On the other hand, when the number of sheets to be printed is very large such as 100 or more, printing should be performed using the fixed speed mode. This makes it possible to avoid a situation in which the fixing device 144 is broken due to occurrence of the edge temperature rise.

Moreover, according to the paper size and the paper type of paper to be printed, the CPU 110 controls screens to be displayed on the operation unit 171. For example, depending on the paper size and the type of paper to be printed, the screen on which a user is allowed to select either the fixed speed mode or the high initial speed mode is displayed, or the screen on which a user is allowed to select only the fixed speed mode is displayed. There are cases where a screen on which a user is allowed to select the print mode is not displayed. For example, there are various sizes and types of form paper, and hence it is difficult for a user to determine whether or not form paper to be printed is available for both the fixed speed mode and the high initial speed mode and make print settings. In this respect, the CPU 110 controls screens to be displayed on the operation unit 171 according to the size and the type of slip form paper to be printed, and this assists a user in making print settings.

Second Embodiment

A description will now be given of a second embodiment. In the first embodiment, when free size is selected for the paper size, the temperature of the fixing device 144 is not adjusted with fine granularity, and setting of the high initial speed mode is not allowed because its width and height are unknown. In the second embodiment, when free size is set for the paper size, the CPU 110 controls the operation unit 171 to display a setting screen for selecting the print mode according to whether or not a setting that causes the CPU 110 to check information about the width and the height of paper included in print data has been made. As a result, even when free size is selected for the paper size, the CPU 110 checks information about the width and the height of paper included in print data and adjusts the temperature of the fixing device 144 with fine granularity. The information about the width and the height of the paper is added to the print data by, for example, the PC 300. A detailed description of the second embodiment will now be given. A hardware arrangement of the image forming apparatus 100 is the same as in the first embodiment, and hence description thereof is omitted.

Figure 11:
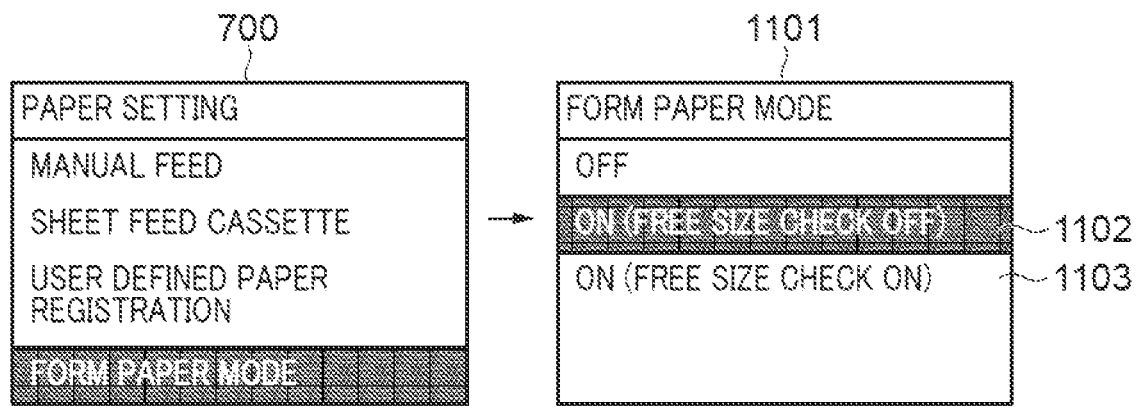
FIG. 11 is a view illustrating an example of transitions between screens displayed on an operation unit in a second embodiment.

FIG. 11 is a view illustrating an example of transitions between screens displayed on the operation unit 171 in the second embodiment. A screen 700 is the same as the screen 500 in FIG. 5A. The CPU 110 control the display of a screen 1101 when the form paper mode option has been selected in the screen 700. The screen 1101 indicates an option to set the form paper mode to "OFF" and options to set the form paper mode to "ON" which include two options: a "free size check OFF" option and a "free size check ON" option which are settings for a free size check (also called paper size check) that causes the CPU 110 to check information about the paper size in print data. The "free size check OFF" option 1102 in the form paper mode "ON" options is a setting that does not cause the CPU 110 to check whether or not the width and the height of paper indicated by information included in print data match the width and the height of printed paper. A "free size check ON" option 1103 in the form paper mode "ON" options is a setting that causes the CPU 110 to check whether or not the width and the height of paper indicated by information included in print data match the width and the height of printed paper.

FIG. 12 is a table used for controlling the display of setting screens in the second embodiment. In the table of FIG. 12, options for standard-size paper and user defined paper are the same as those in the table of FIG. 4. In the table of FIG. 12, "free size check ON" options 1200 are the same as the user defined paper setting options 400 in FIG. 4, and "free size check ON" options 1201 are the same as the free size setting options 401 in FIG. 4.

Figure 13:
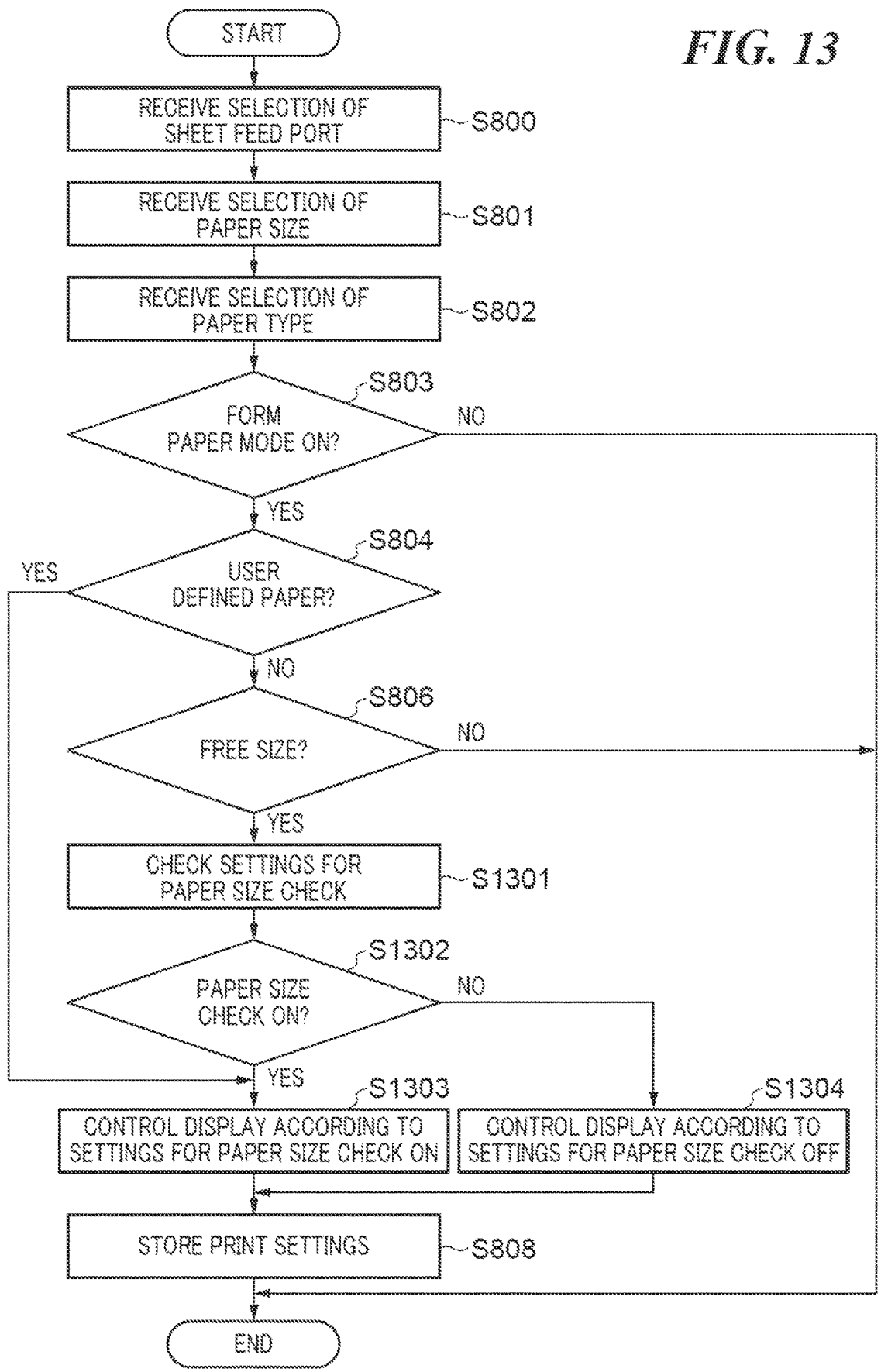
FIG. 13 is a flowchart of an example of a second process in a setting operation in the second embodiment.

A description will now be given of a second process in a setting operation according to the second embodiment. The first process in the setting operation according to the second embodiment is the same as in FIG. 7. FIG. 13 is a flowchart illustrating an example of the second process in the setting operation according to the second embodiment. Steps S800 to S804 and S806 to S808 are the same as those in FIG. 8. In S1301, the CPU 110 checks settings for the paper size check. Namely, the CPU 110 checks whether the "free size check OFF" option 1102 or the "free size check ON" option 1103 has been selected in the screen 1101 in FIG. 11. In S1302, the CPU 110 judges whether or not the "free size check ON" option 1103 has been selected (namely, whether or not the paper size check is ON). When the result of the judgment in S1302 is positive (YES), the CPU 110 lets the process proceed to S1303.

In S1303, by referring to the table of FIG. 12, the CPU 110 uses suitable items for the paper type among the "free size check ON" options 1200 to control the display of a screen on the operating unit 171. On the other hand, when the result of the judgment in S1302 is negative (NO), the CPU 110 refers to the table of FIG. 12 and uses suitable items for the paper type among the "free size check OFF" options 1201 to control the display of a screen on the operation unit 171. Then, the CPU 110 makes print settings according to what was selected in S1303 or S1304.

Figure 14:
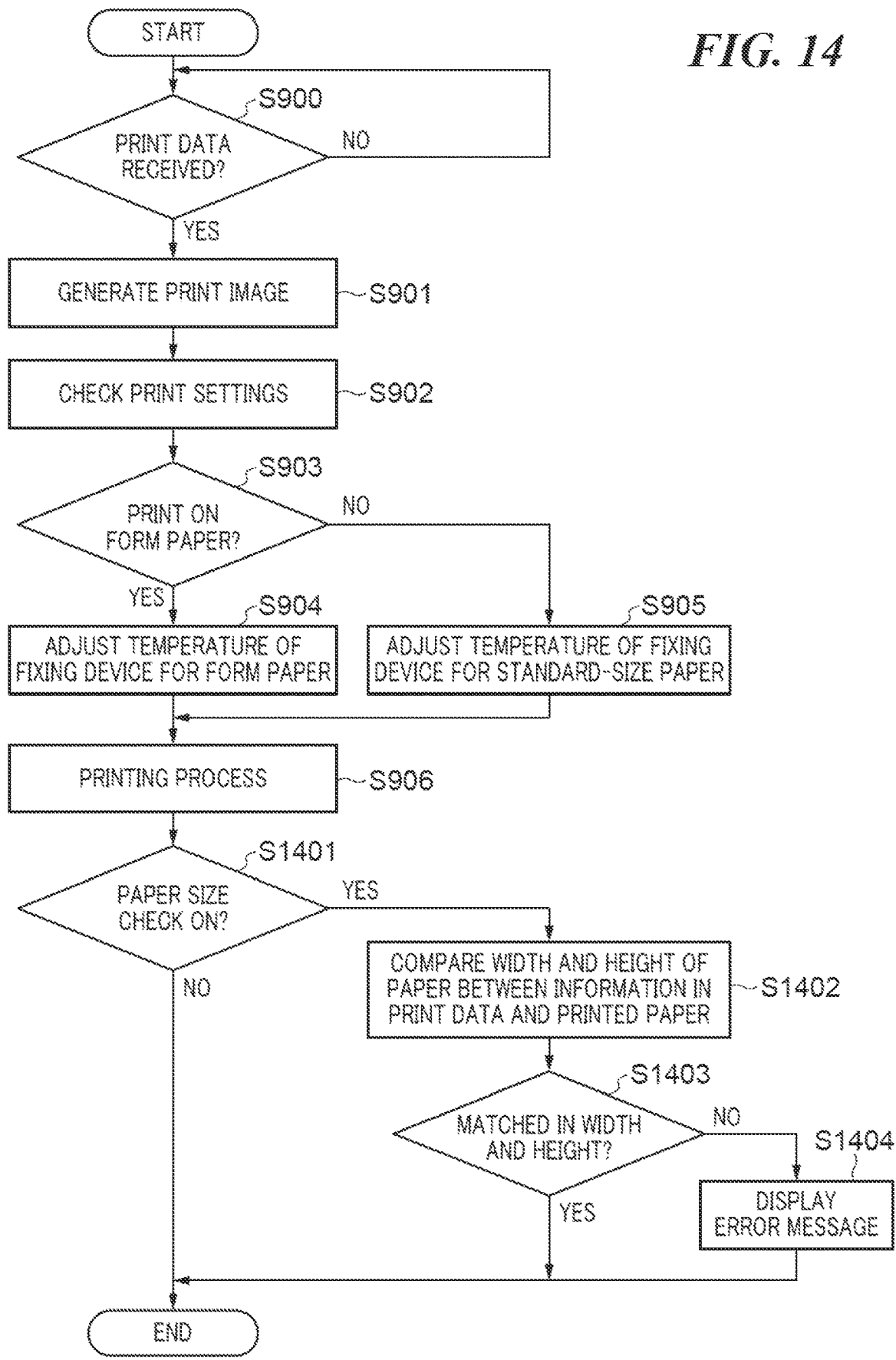
FIG. 14 is a flowchart of an example of a printing process in the second embodiment.

FIG. 14 is a flowchart illustrating an example of a printing process according to the second embodiment. Steps S901 to S906 are the same as those in FIG. 9. After carrying out the process in S906, the CPU 110 lets the process proceed to S1401. In S1401, the CPU 110 judges whether or not the "free size check ON" option 1103 has been selected (namely, whether or not the paper size check is ON). When the result of the judgment in S1401 is negative (NO), the CPU 110 ends the process in the flowchart of FIG. 14. When the result of the judgment in S1401 is positive (YES), the CPU 110 lets the process proceed to S1402. In S1402, the CPU 110 compares the width and the height of paper indicated by information included in print data with the width and height of printed paper. As a result of the comparison in S1402, the CPU 110 judges whether or not the width and the height of the paper indicated by the information included in the print data matches the width and height of the printed paper in S1403.

When the result of the judgment in S1403 is positive (YES), the CPU 110 ends the process in the flowchart of FIG. 14. On the other hand, when the result of the judgment in S1403 is negative (NO), the CPU 110 displays an error message on the operation unit 171 in S1404 because the width and height of the paper indicated by the information included in the print data does not match the width and height of the printed paper. Then, the CPU 110 lets the process in the flowchart of FIG. 14 to end abnormally.

As described above, in the second embodiment, the CPU 110 controls screens to be displayed on the operation unit 171 according to whether or not the "paper size check ON" option 1103 has been selected. When the "paper size check ON" option 1103 has been selected, the screen on which either the fixed speed mode or the high initial speed mode is allowed to be selected for the print mode is displayed on the operation unit 171 according to the paper type. On the other hand, when the "paper size check OFF" option 1102 has been selected, the screen on which only the fixed speed mode is allowed to be selected is displayed on the operation unit 171 according to the paper type. Thus, even if the paper is free size paper, a menu with print settings whose paper size setting is the same as that of user defined paper can be presented according to whether or not the "paper size check ON" option 1103 has been selected.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-207223, filed on Dec. 15, 2020, which is hereby incorporated by reference herein in its entirety.

What is claimed is:
1. An image forming apparatus comprising:
a printer that prints an image on a sheet and that includes a fixing device; and
a controller,
wherein the controller sets one of a first print mode or a second print mode,
wherein the first print mode is a mode in which, after starting printing on a first number of sheets per unit time, the printer decreases a number of sheets on which the printer performs printing per unit time from the first number of sheets per unit time so as to avoid a rise in temperature of the fixing device to a predetermined temperature value due to continuation of the printing on the first number of sheets per unit time, wherein the second print mode is a mode in which the printer performs printing on a second number of sheets per unit time without changing, based on a rise in temperature of the fixing device, a number of sheets on which the printer performs printing per unit time, where the second number is smaller than the first number, and wherein the printer prints the image on the sheet based on one of the first print mode or the second print mode set by the controller.

2. The image forming apparatus according to claim 1, wherein the first number of sheets per unit time is a maximum capability of the image forming apparatus.

3. The image forming apparatus according to claim 1, further comprising a user interface, wherein the user interface receives a designation of the first print mode or the second print mode by a user, and wherein the controller sets one of the first print mode or the second print mode based on the received designation by the user.

4. The image forming apparatus according to claim 1, wherein the controller sets the second print mode based on a paper type set for a sheet feeder that is loading a sheet on which the image is to be printed by the printer.

5. The image forming apparatus according to claim 4, wherein the controller sets the second print mode in a case where thick paper is set as the paper type for the sheet feeder.

6. The image forming apparatus according to claim 3, wherein the controller determines to display, on the user interface, an object for receiving the designation of the second print mode based on a paper type set for a sheet feeder that is loading a sheet on which the image is to be printed by the printer.

7. The image forming apparatus according to claim 3, wherein the controller sets the second print mode based on a paper size set for a sheet feeder that is loading a sheet on which the image is to be printed by the printer.

8. The image forming apparatus according to claim 7, wherein the controller sets the second print mode in a case where free size is set as the paper size for the sheet feeder.

9. A control method for an image forming apparatus that includes a printer to print an image on a sheet and a fixing device, the method comprising:

setting one of a first print mode or a second print mode, wherein in the first print mode, after starting printing on a first number of sheets per unit time, decreasing a number of sheets on which the printer performs printing per unit time from the first number of sheets per unit time so as to avoid a rise in temperature of the fixing device to a predetermined temperature value due to continuation of the printing on the first number of sheets per unit time, and in the second print mode printing on a second number of sheets per unit time without changing, based on a rise in temperature of the fixing device, a number of sheets on which the printer performs printing per unit time, where the second number is smaller than the first number, and printing the image on the sheet based on one of the first print mode or the second print mode that is set.

10. A non-transitory computer-readable storage medium storing a program for causing a computer to execute a control method for an image forming apparatus including a printer that prints an image on a sheet and a fixing device, with the control method comprising;

setting one of a first print mode or a second print mode, wherein in the first print mode, after starting printing on a first number of sheets per unit time, decreasing a number of sheets on which the printer performs printing per unit time from the first number of sheets per unit time so as to avoid a rise in temperature of the fixing device to a predetermined temperature value due to continuation of the printing on the first number of sheets per unit time, and in the second print mode printing on a second number of sheets per unit time without changing, based on a rise in temperature of the fixing device, a number of sheets on which the printer performs printing per unit time, where the second number is smaller than the first number, and printing the image on the sheet based on one of the first print mode or the second print mode that is set.

* * * * *